United States Patent
Hunt

(10) Patent No.: US 8,578,142 B2
(45) Date of Patent: Nov. 5, 2013

(54) SYSTEM AND METHOD FOR SHARED DATA STORAGE

(75) Inventor: Simon Hunt, Naples, FL (US)

(73) Assignee: McAfee, Inc., Santa Clara, CA (US)

( * ) Notice: Subject to any disclaimer, the term of this patent is extended or adjusted under 35 U.S.C. 154(b) by 255 days.

(21) Appl. No.: 13/107,030

(22) Filed: May 13, 2011

(65) Prior Publication Data

US 2012/0290822 A1    Nov. 15, 2012

(51) Int. Cl.
*G06F 9/00* (2006.01)
*G06F 3/00* (2006.01)
*G06F 12/14* (2006.01)

(52) U.S. Cl.
USPC ........... 713/1; 713/2; 710/1; 710/20; 710/200

(58) Field of Classification Search
USPC ................... 713/1, 2; 710/1, 20, 200
See application file for complete search history.

(56) References Cited

U.S. PATENT DOCUMENTS

| | | | |
|---|---|---|---|
| 6,192,471 B1* | 2/2001 | Pearce et al. | 713/2 |
| 6,684,305 B1* | 1/2004 | Deneau | 711/159 |
| 2006/0020779 A1* | 1/2006 | Rothman et al. | 713/2 |
| 2011/0162041 A1* | 6/2011 | Hwang et al. | 726/2 |
| 2012/0259900 A1* | 10/2012 | Kacin et al. | 707/823 |

\* cited by examiner

*Primary Examiner* — Vincent Tran
(74) *Attorney, Agent, or Firm* — Baker Botts L.L.P.

(57) ABSTRACT

Systems and methods for sharing data storage on an electronic device are disclosed. A system may include a memory and a processor, an operating system executing on the electronic device, a preboot application executing on the electronic device, and a virtual drive. The operating system may be configured to mount the virtual drive and the preboot application may also be configured to mount the virtual drive.

20 Claims, 2 Drawing Sheets

SYSTEM AND METHOD FOR SHARED DATA STORAGE

TECHNICAL FIELD

The present disclosure relates in general to electronic data storage, and more particularly to data storage shared between layers of an electronic device.

BACKGROUND

As the ubiquity and importance of digitally stored data continues to rise, the importance of keeping that data secure rises accordingly. While companies and individuals seek to protect their data, other individuals, organizations, and corporations seek to exploit security holes in order to access that data and/or wreak havoc on the computer systems themselves. Generally the different types of software that seek to exploit security holes can be termed "malware," and may be categorized into groups including viruses, worms, adware, spyware, and others.

Many different products have attempted to protect computer systems and their associated data from attack by malware. One such approach is the use of anti-malware programs such as McAfee AntiVirus, McAfee Internet Security, and McAfee Total Protection. In addition to the threats posed by malware, owners and operators of computer systems may seek to protect their data from other types of security risks such as theft. In such situations, a computer system may have some or all of its data and/or data storage devices encrypted. It then may become important for the anti-malware products and security products to share data in order to most effectively protect the computer system.

The ability to share storage between different types of applications such as anti-malware and security products increases as computer systems grow in complexity, adding virtualization, adding multiple operating systems, and moving security products around the various layers that comprise the computer system. Additionally, problems arise in some shared storage solutions in the duplication and synchronization of shared data.

SUMMARY OF THE DISCLOSURE

In accordance with the teachings of the present disclosure, the disadvantages and problems associated with sharing data between an application running within an operating system and an application running outside of an operating system may be improved, reduced, or eliminated.

In accordance with one embodiment of the present disclosure, a system for shared data storage on an electronic device comprising a memory, a driver, an operating system executing on the electronic device, a preboot application executing on the electronic device, and a virtual drive comprising a reserved section of the memory. The operating system may be configured to mount the virtual drive and the preboot application may also be configured to mount the virtual drive.

In accordance with another embodiment of the present disclosure, a computerized method for shared data storage on an electronic device comprising a memory, a driver, an operating system executing on the electronic device, a preboot application executing on the electronic device, and a virtual drive comprising a reserved section of the memory. The operating system may be configured to mount the virtual drive and the preboot application may also be configured to mount the virtual drive.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DRAWINGS

Preferred embodiments and their advantages are best understood by reference to FIGS. 1 through 4, wherein like numbers are used to indicate like and corresponding parts.

For the purposes of this disclosure, an electronic device may include any device, subdevice, or combination of devices and/or subdevices capable of storing, drivering, sending, receiving, using, or handling data stored in digital form, including data stored on computer-readable media. Computer-readable media may include any device, subdevice, or combination of devices and/or subdevices configured to store digital data, including without limitation hard disk drives, flash memory, read only memory, random access memory, optical memory, solid state memory, or any other type of removable and/or fixed media used to store digital data.

Figure 1:
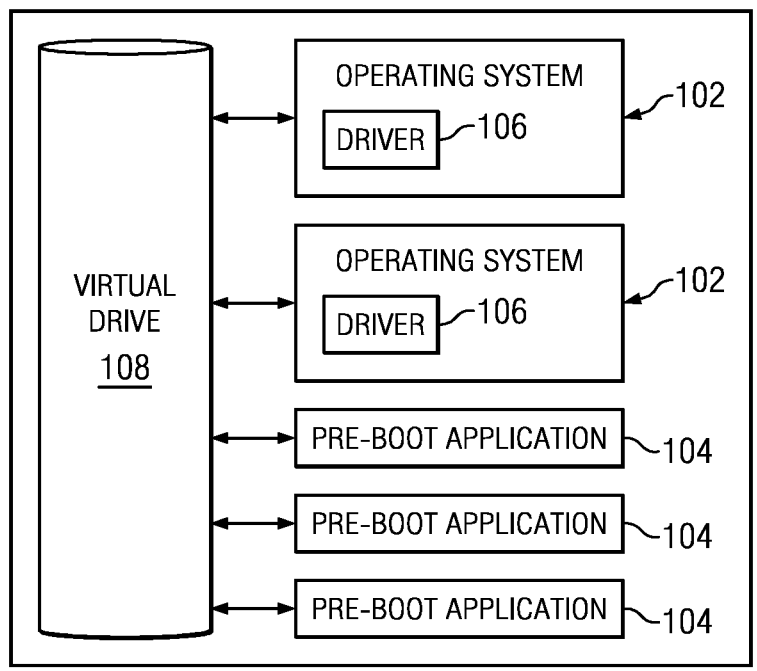
FIG. 1 illustrates a high level diagram of an electronic device with a virtual drive shared between one or more operating systems and one or more pre-boot applications, in accordance with certain embodiments of the present disclosure.

FIG. 1 illustrates a high level diagram of an electronic device 100 with a virtual drive 108 shared between any one or more operating systems 102 and one or more pre-boot applications 104, in accordance with certain embodiments of the present disclosure. As an illustrative example only, electronic device 100 may be a personal computer. Electronic device 100 may run one or more operating systems 102. In some embodiments, operating system 102 may be Windows XP, Windows 7, Linux, UNIX, Android, Mac OS X, or any other operating system. Electronic device 100 may run one or more operating systems 102 on multiple partitions of computer-readable media or on a single partition as virtualizations. Additionally, in some embodiments, electronic device 100 may run a virtual machine monitor, or hypervisor, such as Microsoft Hyper-V or VMware. Such a hypervisor may allow electronic device 100 to run multiple virtualized instances of operating systems 102. Although FIG. 1 illustrates two operating systems 102 on electronic device 100, electronic device 100 may run one or more operating systems 102.

In addition to one or more operating systems 102, electronic device 100 may also be configured to run one or more pre-boot applications 104. In some embodiments, pre-boot applications 104 may be an application running outside of operating system(s) 102. As an illustrative example, pre-boot applications 104 may include malware scanners, calendar applications, web browsers, secure login applications, or any other application running outside of operating system(s) 102. In some embodiments, pre-boot applications may run on electronic device 100 at the same layer as the Basic Input/Output System ("BIOS").

In operation, it may be desirable for operating system(s) 102 and pre-boot application(s) 104 to share data. As an illustrative example, one of the pre-boot applications 104 may be a malware scanner. A malware scanner may run as a pre-boot application in order to further secure the inner workings of the malware scanner from hackers and/or malware attacks on the scanner itself. Additionally, in order to keep the malware signatures resident in the malware scanner up to date, it may be necessary or desirable for the malware scanner to receive periodic updates. In some embodiments, these periodic updates may be received via a network interface, such as an internet download from an anti-malware service provider such as McAfee. Such periodic updates may require a dedicated network connection. Alternatively, in order to improve usability for the end user, it may be necessary or desirable to perform such updates within the operating system in a mode that is comfortable to the end user. For instance, an end user may use a standard web browser such as Internet Explorer to perform the periodic updates. This may present some difficulties in transmitting the updated malware signatures to the pre-boot malware scanner.

As another illustrative example, one of the pre-boot applications 104 may be a calendar application or an internet browser. Such applications may be desirable for certain types of electronic devices 100 in order to provide enhanced usability to the end user. For example, a laptop computer may include a pre-boot electronic calendar or internet browser so that the end user may perform certain tasks without requiring the full boot driver of electronic device 100. In order to enhance such applications, it may be necessary or desirable to share certain information between the pre-boot calendar and internet browser applications and their counterpart operating system calendar and/or internet browser applications. For example, in some embodiments, electronic device 100 may include an operating system 102 running a calendar application such as Microsoft Outlook and a pre-boot application 104 that is a calendar application. In order for the pre-boot calendar to be most effective, it may be necessary or desirable to share information such as contacts, appointments, and other information with the calendar application running in operating system 102. Additionally, electronic device 100 may include an operating system 102 running an internet browser such as Microsoft Explorer and a pre-boot application 104 that is an internet browser. In order for the pre-boot internet browser to be most effective, it may be necessary or desirable to share information such as browser history, bookmarks, and other information between the pre-boot browser and the browser running in operating system 102. Sharing such information between operating systems(s) 102 and pre-boot application(s) 104 may present certain difficulties.

One potential solution to these data sharing issues includes duplicating the data that needs to be shared between operating system(s) 102 and pre-boot application(s) 104. Alternatively, potential solutions may include synchronizing the data that needs to be shared between operating system(s) 102 and pre-boot application(s) 104. However, such solutions are prone to synchronization and other data duplication failures, in addition to other risks.

Referring again to FIG. 1, in some embodiments operating system(s) 102 may share data with pre-boot application(s) 104 via virtual drive 108. As described in more detail below with reference to FIGS. 2-3, operating system(s) 102 may mount virtual drive 108 and pre-boot application(s) 104 may also mount virtual drive 108. Virtual drive 108 may, in some embodiments, store data from both operating system(s) 102 and pre-boot application(s) 104. In some embodiments, virtual drive 108 may also be encrypted to provide additional security to the data stored in virtual drive 108. Virtual drive 108 may be configured to encrypt data received from operating system(s) 102 and/or pre-boot application(s) 104. The desirability of encrypting data from operating system(s) 102 and/or pre-boot application(s) 104 may depend on the particular configuration desired. In some embodiments, some or all of the computer-readable media resident on electronic device 100 may be encrypted. For example, a total disk encryption tool, such as McAfee Endpoint Encryption, may be used to encrypt an entire hard disk drive used by a personal computer. In other examples, electronic device 100 may include multiple drives, network drives, optical drives, removable media, etc., wherein some or all of that computer-readable media may be encrypted in order to provide the desired level of data security.

In some embodiments, virtual drive 108 may be mounted by operating system(s) 102 by a process including the writing of a large file to a portion of memory of electronic device 100 and the creation of a map of the memory sectors corresponding to that file. The written file may be of a size approximately the desired size of the virtual drive. As an illustrative example, the file may be 250 MB, 500 MB, 1000 MB, or any other size appropriate for virtual drive 108 and configured to be stored on computer-readable media of electronic device 100. The creation of the memory map may be done by well known virtual drive mounting techniques, such as those used by McAfee Endpoint Encryption. In some configurations, the map may include the location of the memory locations occupied by the file. The file may be stored in physical computer readable media on electronic device 100 or on another electronic device 100. The file may, in other configurations, be stored in virtual computer readable memory on electronic device 100 or on another electronic device 100.

In some embodiments, each operating system 102 may include a driver 106 running on operating system 102. Driver 106 may include a device driver configured to arbitrate access to virtual drive 108 for operating system 102, as described in more detail below with reference to FIG. 2. Additionally, in some embodiments, virtual drive 108 may be mounted by pre-boot application(s) 104 by applying the memory map generated as a result of operating system 102 writing to memory the file of approximately the desired size for virtual drive 108. In this manner, operating system(s) 102 may share data with pre-boot application(s) 104 in a bit-shared manner without repartitioning the computer-readable media of electronic device 100.

In some embodiments, the computer-readable media of electronic device 100 may be encrypted. As an illustrative example, electronic device 100 may be a personal computer with full disk encryption provided by McAfee Endpoint Encryption. In some embodiments, the encryption may be provided by software running on computer-readable media, hardware, firmware, and/or some combination of these. In some embodiments, the encryption software may be responsible for instructing operating system(s) 102 in how to create and/or use virtual drive 108 as described in more detail below with reference to FIGS. 2-3.

Figure 2:
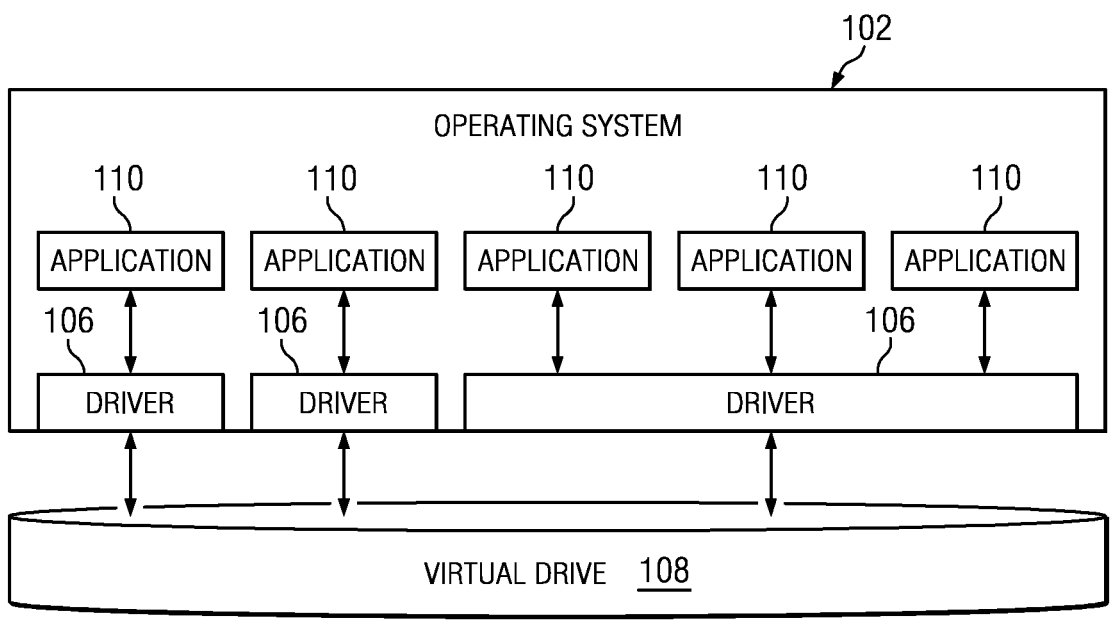
FIG. 2 illustrates a high level diagram of an operating system running on an electronic device, in communication with a virtual drive, in accordance with certain embodiments of the present disclosure.

FIG. 2 illustrates a high level diagram of an operating system 102 running on electronic device 100 in communication with virtual drive 108, in accordance with certain embodiments of the present disclosure. In some embodiments, operating system 102 may include one or more drivers 106 communicatively coupled to one or more data requesting applications 110 running in operating system 102. Although FIG. 2 illustrates three instances of driver 106 and five instances of data requesting application 110, operating system 102 may include more or fewer driver(s) 106 and data requesting application(s) 110. As described in more detail above with reference to FIG. 1, operating system 102 may mount virtual drive 108 and store data in virtual drive 108 in an encrypted or unencrypted manner.

In some embodiments, data requesting application(s) 110 may include applications running in operating system 102 configured to read and/or write data from virtual drive 108. As an illustrative example only, data requesting application(s) 110 may include calendar programs (e.g., Microsoft Outlook), internet browsers (e.g., Microsoft Explorer), productivity applications (e.g., Microsoft Word, Microsoft Excel), malware scanners (e.g., McAfee Antivirus), operating system-level agents for pre-boot application(s) 104, proprietary applications, and/or any other application running in operating system 102 configured to read and/or write data to virtual drive 108.

In some embodiments, data requesting application(s) 110 may need or desire data stored on virtual drive 108. Operating system 102 may include one or more driver(s) 106 communicatively coupled to virtual drive 108. In some embodiments, all driver(s) 106 may communicate directly with virtual drive 108. In the same or other embodiments, only one driver 106 may be able to communicate directly with virtual drive 108.

In some embodiments, one or more data requesting applications 110 may be communicatively coupled to one or more drivers 106. For ease of description, driver 106 is depicted as separate from data requesting application 110. However, in some configurations driver 106 may be an integral part of data requesting application 110. That is, driver 106 may be a subroutine, function, or other piece of software executable by data requesting application 110. In other embodiments, driver 106 may be a separate subroutine, function, or other piece of software called by data requesting application 110. Driver 106 may also be any piece of software executable on computer-readable media configured to provide access to virtual drive 108 to application 110.

In some embodiments, there may be a one-to-one relationship between driver 106 and data requesting application 110. As an illustrative example, driver 106 may be a device driver configured to communicatively couple data requesting application 110 to virtual drive 108. In other embodiments, there may be a many-to-one relationship between driver 106 and data requesting application 110. As an illustrative example, driver 106 may be a device driver configured to communicatively couple multiple productivity applications (e.g., Microsoft Office, Microsoft Excel) running in operating system 102 to virtual drive 108. Depending on the desired configuration, the relationship between the number of drivers 106 and data requesting applications 110 may depend on the desired level of security, as described in more detail below.

In some embodiments, access to virtual drive 108 may be unrestricted, or at least unmediated. As an illustrative example, in the case of pre-boot application 104 being a calendar program, it may be necessary or desirable to allow multiple data requesting applications 110 to read and/or write data to virtual drive 108. Multiple data requesting applications 110 may be integrated (e.g., the Microsoft Office suit of applications). Such data requesting applications 110 may find it more efficient to read and/or write calendar data to a common data source rather than communicating through a central communication point. In such an illustrative example, each data requesting application 110 may be communicatively coupled to a driver 106 configured to communicate with virtual drive 108. In other embodiments, it may be necessary or desirable to provide a single driver 106 for some data requesting applications 110 and a separate driver 106 for other data requesting applications 110. In some embodiments, access to virtual drive 108 may be unmediated for such applications.

In the same or other embodiments, one or more data requesting applications 110 may be communicatively coupled to one driver 106. As an illustrative example, driver 106 may be a part of a malware scanner running on operating system 102. As an additional illustrative example, driver 106 may be a part of a malware scanner agent running on operating system 102, the malware scanning agent acting to provide support within operating system 102 for a malware scanner outside of operating system 102, for example running as a pre-boot application 104.

In some embodiments, driver 106 may be configured to arbitrate access to virtual drive 108. Driver 106 may be configured to be the only software executable on computer-readable media within operating system 102 configured to access virtual drive 108. Driver 106 may arbitrate access to virtual drive 108 by maintaining a list of preapproved data requesting applications 110 allowed to read and/or write data to virtual drive 108. As an illustrative example, if driver 106 is a part of a malware scanner agent, driver 106 may only allow the malware scanner agent and/or certain aspects of the internet browser used by an end user to download updates to malware signatures to access virtual drive 108. As an additional illustrative example, driver 106 may be a driver controlled by operating system 102 and virtual drive 108 may be configured to store critical system data. Driver 106 may then be configured to only allow certain other drivers 106 and/or data requesting applications 110 to read and/or write data to virtual drive 108. In some embodiments, the arbitration of access to virtual drive 108 may be based on a set of predetermined criteria. For example, driver 106 may only allow access to data requesting applications 110 that meet certain security thresholds such as having associated processes that are signed and visible. As an additional example, driver 106 may only allow access to data requesting applications 110 that appear on a list of preapproved applications allowed access to virtual drive 106.

In some embodiments, the communication path between operating system 102 and virtual drive 108, and the communication path between pre-boot application 014 and virtual drive 108 may include an encrypted channel. The encrypted channel may provide a secure means of communicating data between operating system 102 and virtual drive 108 or between pre-boot application 104 and virtual drive 108. Such an encrypted channel between may be created by known means, such as those employed by McAfee Endpoint Encryption.

In some embodiments, driver 106 may be configured to encrypt communication between operating system 102 and virtual drive 108. This encryption may be partial or total. In some embodiments, driver 106 may require data requesting applications 110 communicating with driver 106 to also communicate in an encrypted manner. In the same or other embodiments, driver 106 may encrypt data received from data requesting applications 110 before transmitting the data to virtual drive. Additionally, driver 106 may be configured to receive data from virtual drive 108 in an encrypted manner. Driver 106 may also be configured to decrypt data received from virtual drive 108 prior to communicating the data to data requesting applications 110. In certain embodiments, driver 106 may arbitrate access to virtual drive 108 in order to provide secure access to virtual drive 108 for operating system 102.

Although only one operating system 102 is illustrated, multiple operating systems 102 may be present within electronic device 100, as described above with reference to FIG. 1. In some embodiments, operating system(s) 102 may be the same or different operating systems, and may be present on separate partitions of computer-readable media, on the same partition, and/or on virtual machines.

FIGS. 1-2 illustrate a system for shared data storage on electronic device 100. In some embodiments, operating system(s) 102, pre-boot application(s) 104, and virtual drive 108 are illustrated on a single electronic device 100, in accordance with certain embodiments of the present disclosure. In some embodiments, multiple operating systems 102, pre-boot applications 104, and virtual drive 108 may be present on physically separate electronic devices 100 without departing from the scope of the present disclosure. As an illustrative example, a first electronic device 100 may be a server hosting a hypervisor running multiple operating systems 102. Pre-boot applications 104 may run on the same or different electronic device 100 as operating systems 102. Additionally, virtual drive 108 may be configured to run on a separate server. As an illustrative example, virtual drive 108 may reside on a separate server from operating system 102 and/or pre-boot applications 104. In cloud computing applications, for example, a service provider may provide virtual drive 108 to multiple end users and their corresponding electronic devices 102 in order to provide increased security of and for virtual drive 108.

Figure 3:
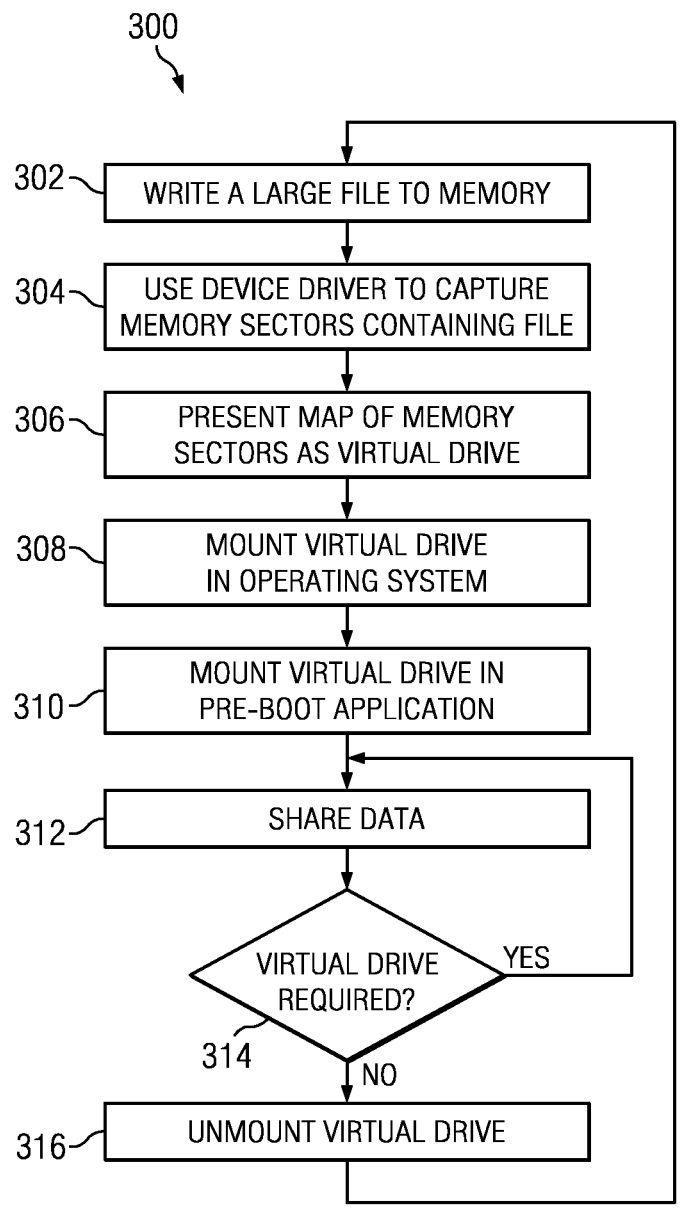
FIG. 3 illustrates a flow chart of an example method for sharing data storage between one or more operating system(s) and one or more pre-boot application(s), in accordance with certain embodiments of the present disclosure.

FIG. 3 illustrates a flow chart of an example method 300 for sharing data storage between one or more operating system(s) 102 and one or more pre-boot application(s) 104, in accordance with certain embodiments of the present disclosure. Method 300 may include mounting the virtual drive in the operating system(s) 102 and mounting the virtual drive in the pre-boot application(s) 104.

According to one embodiment, method 300 preferably begins at step 302. Teachings of the present disclosure may be implemented in a variety of configurations of electronic device 100. As such, the preferred initialization point for method 300 and the order of steps 302-316 comprising method 300 may depend on the implementation chosen.

At step 302, electronic device 100 writes a large file to computer-readable media. In some embodiments, the file may be of a size corresponding to the desired size of virtual drive 108. As an illustrative example, the file may be 250 MB, 500 MB, 1000 MB, or any other size appropriate for virtual drive 108 and configured to be stored on computer-readable media of electronic device 100. After writing the large file, method 300 may proceed to step 304.

At step 304, electronic device 100 may capture the sectors of computer-readable media used to store the file written at step 302. After capturing the memory sectors, method 300 may proceed to step 306, where electronic device 100 may create a map of the memory sectors for presentation to various applications as some or all of virtual drive 108. After presenting the map, method 300 may proceed to step 308.

At step 308, one or more operating system(s) 102 may mount virtual drive 108 through the use of the memory map created at step 306. As described in more detail above with reference to FIGS. 1-2, operating system(s) 102 may accomplish this through the use of a device driver or other appropriate driver 106, which, in some embodiments, may then arbitrate access to virtual drive 108. After operating system(s) 102 mount virtual drive 108, method 300 may then proceed to step 310.

At step 310, one or more pre-boot application(s) 104 may mount virtual drive 108 through the use of the memory map created at step 306. As described in more detail above with reference to FIGS. 1-3, pre-boot application(s) 104 may accomplish this through the use of a device driver or other appropriate driver. After mounting virtual drive 108 by pre-boot application(s) 104, method 300 may then proceed to step 312.

At step 312, operating system(s) 102 and pre-boot application(s) 104 may share data as described in more detail above with reference to FIGS. 1-3. In some embodiments, the sharing of data at step 312 may continue for the duration of the desired use of virtual drive 108. In some embodiments, virtual drive 108 may only be needed for temporary purposes. In other embodiments, virtual drive 108 may be needed or desired for more permanent-type applications. After sharing data, method 300 may proceed to step 314.

At step 314, electronic device 100 may determine whether virtual drive 108 is still required for use. If virtual drive 108 is still required, method 300 may return to step 312, where operating system(s) 102 and pre-boot application(s) 104 may continue to share data. If virtual drive 108 is no longer required, method 300 may proceed to step 316, where operating system(s) 102 and/or pre-boot application(s) 104 may unmount virtual drive 108. After unmounting virtual drive 108, method 300 may return to step 302, where the creation driver for virtual drive 108 may begin again when needed.

Although FIG. 3 discloses a particular number of steps to be taken with respect to method 300, method 300 may be executed with more or fewer steps than those depicted in FIG. 3. For example, FIG. 3 illustrates, at step 316, the operating system(s) 102 and pre-boot application(s) 104 unmounting virtual drive 108. In some embodiments, all applications accessing virtual drive 108 may unmount virtual drive 108 at the same time. In other embodiments, a subset of applications communicatively coupled to virtual drive 108 may unmount virtual drive 108, while other applications do not. In addition, although FIG. 3 discloses a certain order of steps comprising method 300, the steps comprising method 300 may be completed in any suitable order. For example, in the embodiment of method 300 shown, operating system(s) 102 mount virtual drive 108 prior to pre-boot application(s) 104 mounting virtual drive 108. However, in some embodiments it may be necessary or desirable to reverse the order and have pre-boot application(s) 104 mount virtual drive 108 first.

What is claimed is:

1. A system for shared data storage on an electronic device, the system comprising:
    a memory;
    a processor;
    an operating system configured to execute on the electronic device, the operating system residing in the memory for execution by the processor;
    a preboot application configured to execute on the electronic device, the preboot application residing in the memory for execution by the processor; and
    a virtual drive, wherein:
        the operating system is configured to mount the virtual drive by writing a data file to the memory;
        the operating system is further configured to create a memory map, the map associated with a location of the data file in the memory;
        a device driver configured to execute on the electronic device, the device driver residing in the memory for execution within the operating system by the processor; and
    wherein access to the virtual drive is arbitrated at least by the device driver;
        a plurality of data requesting applications configured to execute on the electronic device, the plurality of data requesting applications residing in the memory for execution within the operating system by the processor, and wherein the plurality of data requesting applications access the virtual drive via the device driver;
the preboot application is configured to apply the memory map to mount the virtual drive; and
the virtual drive is bit shared between the operating system and the preboot application.

2. The system of claim 1, wherein communication between the virtual drive and the operating system, and between the virtual drive and the preboot application occurs over an encrypted channel.

3. The system of claim 1, wherein the virtual drive is configured to encrypt data received from the operating system.

4. The system of claim 1, wherein the virtual drive is configured to encrypt data received from the preboot application.

5. The system of claim 1, wherein the virtual drive is configured to securely store malware signatures.

6. The system of claim 1, wherein operating system-level access to the virtual drive is limited to a set of preapproved applications executable by the operating system.

7. The system of claim 1, wherein preboot-level access to the virtual drive is limited to a set of preapproved applications executable by the preboot application.

8. The system of claim 1, wherein access to the virtual drive is limited to applications meeting a set of predetermined criteria.

9. The system of claim 1, wherein the memory comprises a fully encrypted hard disk.

10. A method for shared data storage on an electronic device including an operating system and a preboot application, the method comprising:
mounting a virtual drive in the operating system by writing a data file to a memory;
creating a memory map, the memory map associated with a location of the data file in the memory;
mounting the virtual drive in the preboot application by applying the memory map, the virtual drive being bit shared between the operating system and the preboot application;
arbitrating access to the virtual drive through a device driver;
accessing the virtual drive by a plurality of data requesting application via the device driver.

11. The method of claim 10, wherein communicating data to the virtual drive comprises communicating data over an encrypted channel.

12. The method of claim 10, where in the virtual drive is configured to encrypt data received from the operating system.

13. The method of claim 10, where in the virtual drive is configured to encrypt data received from the preboot application.

14. The method of claim 10, where in the virtual drive is configured to securely store malware signatures.

15. The method of claim 10, wherein operating system-level access to the virtual drive is limited to a set of preapproved applications executable by the operating system.

16. The method of claim 10, wherein preboot-level access to the virtual drive is limited to a set of preapproved applications executable by the preboot application.

17. The method of claim 10, wherein access to the virtual drive is limited to applications meeting a set of predetermined criteria.

18. The method of claim 10, wherein the memory comprises a fully encrypted hard disk.

19. At least one machine readable storage medium, having instructions stored thereon, the instructions when executed on a machine, cause the machine to:
mount a virtual drive in the operating system by writing a data file to a memory;
create a memory map, the memory map associated with a location of the data file in the memory;
mount the virtual drive in the preboot application by applying the memory map, the virtual drive being bit shared between the operating system and the preboot application;
arbitrating access to the virtual drive through a device driver;
accessing the virtual drive by a plurality of data requesting application via the device driver.

20. The machine readable storage medium of claim 19, wherein access to the virtual drive is limited to applications meeting a set of predetermined criteria.

* * * * *